SIMPLIFIED DIODE CIRCUIT FOR SEQUENTIALLY FLASHING PHOTOFLASH LAMPS

Filed Jan. 7, 1971

Inventor:
Sang-Chul Kim
by Norman C. Fulmer
His Attorney

United States Patent Office 3,669,607

Patented June 13, 1972

3,669,607

SIMPLIFIED DIODE CIRCUIT FOR SEQUENTIALLY FLASHING PHOTOFLASH LAMPS

Sang-Chul Kim, Cleveland Heights, Ohio, assignor to General Electric Company

Filed Jan. 7, 1971, Ser. No. 104,653
Int. Cl. F21k *5/02*
U.S. Cl. 431—95 12 Claims

ABSTRACT OF THE DISCLOSURE

A simplified diode type of circuit for causing sequential flashing of photoflash lamps from firing pulses of electrical energy. The basic circuit consists of four flash lamps connected in series in a closed electrical loop. Diodes are connected "criss-cross" between diagonally opposite lamp junctions of the series loop, and the circuit is adapted for connection to a source of firing pulses across one of the flash lamps. Circuit modifications are disclosed for different numbers of flash lamps.

CROSS REFERENCES TO RELATED APPLICATIONS

Patent application Ser. No. 29,547, filed Apr. 17, 1970, Edward L. Laskowski, "Diode Circuit for Sequentially Flashing Photoflash Lamps," assigned to the same assignee as the present invention.

Patent application Ser. No. 42,952, filed June 3, 1970, Sang-Chul Kim, "Simplified Resistor Circuit for Sequentially Flashing Photoflash Lamps," assigned to the same assignee as the present invention.

BACKGROUND OF THE INVENTION

The invention is in the field of electronic circuitry for sequentially flashing photoflash lamps, and is particularly useful with a unitary array of flash lamps, such as three or four or more lamps arranged to radiate their light in the same direction when they are sequentially flashed, so that the array need not be moved nor removed until all of its lamps have been flashed.

Numerous circuits have been devised for sequentially flashing photoflash lamps by pulses of electrical energy such as are obtained from a battery through a momentarily closed switch or from a capacitor which has been charged through a resistor from a battery, or from some other suitable energy source. Such a pulse of electrical energy usually is initiated by closure of a switch associated with the shutter mechanism of a camera. A type of circuit heretofore proposed employs mechanically actuated switches for applying the electrical pulses to successively different flashbulbs; another type of circuit utilizes heat-responsive or light-responsive means associated with the flash lamps and adapted to actuate switching means for connecting the pulse source to successively different flash lamps as each lamp becomes flashed; and a further type of circuit utilizes transistors or thyristors for automatically connecting the pulse source to successively different flash lamps as each lamp becomes flashed.

Another previously proposed circuit employs resistors successively connected in series with a plurality of individual flash lamps, so that the lamps are connected in electrical parallel through the resistors. The firing pulse source is connected to an end of the circuit, whereby each flash lamp is connected across the pulse source through successively greater resistance. The first pulse flashes the nearest lamp, which becomes an open circuit upon flashing, whereupon the next pulse flashes the next lamp, etc.

The above-referenced Laskowski patent application discloses a cricuit which is an improvement over the above-described series-resistance lamp flashing circuit, and comprises diodes successively connected in series between the individual photoflash lamps.

The above-referenced Kim patent application discloses an advantageous simplified resistance circuit in which resistors are connected "criss-cross" between diagonally opposite lamp junctions of a closed series electrical loop formed by four flash lamps.

SUMMARY OF THE INVENTION

Objects of the invention are to provide an improved circuit for sequentially flashing flashbulbs; and to provide such a circuit that is low in cost and highly reliable in operation.

The invention comprises, briefly and in a preferred embodiment, a basic circuit configuration of four photoflash lamps connected in series in a closed electrical loop. Two diode means are connected "criss-cross" between diagonally opposite lamp junctions of the series loop. The circuit is adapted for connection to a source of firing pulses across one of the flash lamps. The two diode means have mutually different threshold voltage characteristics, for causing the lamps to be flashed sequentially, one at a time, by sequentially occurring firing voltage pulses. The invention further comprises a combination of two or more of the basic circuit configurations connected together so that the "last" lamp of one configuration functions simultaneously as the "first" lamp of the next configuration. By thus combining basic configurations, and by omitting one or more of the lamps or replacing them with resistors, a circuit array of any desired number of flash lamps may be provided. The simplified circuit of the invention requires only two diode means for controlling four flash lamps, or four diode means for controlling seven flash lamps. The circuit of the invention also achieves a desirable function of equalizing the amount of firing pulse energy that is successively applied to the different flash lamps, thus improving the reliability of flashing one lamp per firing pulse.

DESCRIPTION OF THE PREFERRED EMBODIMENT

Figure 1:
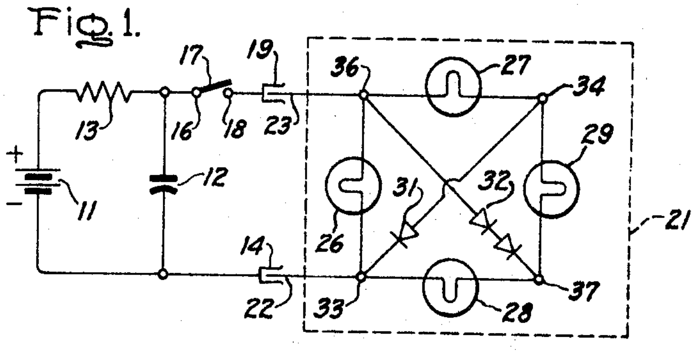
FIG. 1 is an electrical schematic diagram of a preferred embodiment of the invention.

In the circuit of FIG. 1, a battery 11 is connected to charge a capacitor 12 through a resistor 13. In a preferred arrangement, the battery 11 has a voltage of six volts, the capacitor 12 has a capacitance of 500 microfarads, and the resistor 13 has a resistance of 1000 ohms. One terminal of the capacitor 12 is connected to a connector terminal 14, and the other terminal of capacitor 12 is connected to a terminal 16 of a switch 17, the other terminal 18 thereof being connected to a second connector terminal 19. The switch 17 is adapted to be momentarily closed in synchronization with the opening of a camera shutter, in well-known manner. The circuitry thus far described functions as a source of electrical energy pulses for flashing photoflash lamps, and may be incorporated in a camera, or in a flash attachment for use with a camera. Although the firing pulse is sometimes called a "voltage" pulse, it is primarily the energy of the pulse, comprising the product of voltage, current, and time duration, that causes a lamp to flash.

A flash lamp array unit 21 is provided with a pair of connector prongs 22 and 23 adapted for electrical engagement with the terminals 14 and 19, respectively. The unit 21 contains four photoflash lamps 26 through 29 which may be of conventional type, such as General Electric type AG–1, each containing a filament provided with electrical connection lead wires and adapted for initiating a flash of combustible material contained within the bulb. The filaments of the flash lamps 26–29 are connected in series in a closed electrical loop, and a pair of diode means 31, 32 are connected "criss-cross" betweeen diagonally opposite lamp junctions; that is, the diode means 31 is connected between the diagonally opposite lamp junctions 33 and 34, and the diode means 32 is connected between the diagonally opposite lamp junctions 36 and 37. The connector prongs 22 and 23 are connected electrically to the junctions 33 and 36, across the first lamp 26.

Figure 4:
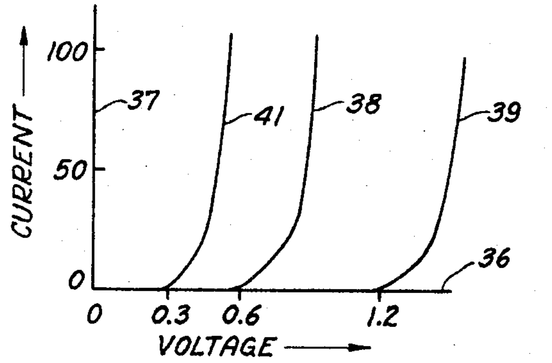
FIG. 4 shows current-voltage characteristics of different diode means.

The diode means 31 and 32 have different threshold voltage values of conductivity; for example, if the flash lamps 26–29 each have a filament resistance of 0.6 ohm, the diode means 31 preferably has a threshold of about 0.6 volt and the diode means 32 preferably has a threshold of about 1.2 volts. The diode means 31 may be, for example, a single General Electric silicon diode type IN5060, and the diode means 32 may comprise two such diodes in series. In FIG. 4, in which diode voltage is represented by the horizontal axis 36 and diode current is represented by the vertical axis 37, the curve 38 is the current-voltage characteristic of a typical silicon diode (having a conduction threshold of 0.6 volt) and curve 39 is the current-voltage characteristic of two such diodes in series (having a conduction threshold of 1.2 volts). Curve 41 is the current-voltage characteristic of a typical germanium diode (having a conduction threshold of 0.3 volt). If the flash lamps 26–29 each had a filament resistance of about 0.3 ohm, then the diode means 31 can be a single silicon diode. Instead of the diode means being discrete elements, they may all be formed on a single monolithic integrated circuit semiconductor chip.

Preferably the lamps 26–29 of the array 21 are provided with individual reflectors, and arranged to radiate the light emitted therefrom in the same direction. If desired, another combination of lamps and resistors may be provided in the unit 21, for radiating the light emission in the opposite direction, so that when all of the lamps at the front of the unit have been flashed, the unit may be turned around so that the rear array of lamps will then face frontwardly, for obtaining an additional number of flashes from a single unit. Other connector prongs similar to 22 and 23 can be provided for connecting the rear array of lamp circuitry to the connectors 14 and 19 when the unit is turned around so that the "rear" array of flash lamps faces frontwardly.

If desired, the flash array unit 21 may be removed from the camera or flash adaptor after some of its lamps have been flashed, and reinserted at a later time for flashing the remaining lamps. After the lamps have been flashed, the array unit 21 may be discarded.

The circuit of FIG. 1 functions as follows. Upon a momentary closing of the switch 17, in synchronization with the opening of a camera shutter, the electrical energy stored in the capacitor 12 discharges into the circuit of the lamp unit 21, in the form of an electrical pulse having an approximately exponential decay characteristic. Most of the capacitor's electrical energy discharges through the filament of the first lamp 26, and the remaining pulse energy flows through three parallel paths provided by the lamps 27, 28, and 29; the diode means 31 and lamp 27; and the diode means 32 and lamp 28. The pulse energy flowing through the first lamp 26 is sufficient for causing this lamp to flash; whereas the amount of pulse energy flowing through the filaments of the remaining lamps is not sufficient for causing them to flash. As the electrical energy of the pulse from capacitor 12 discharges through the filament of lamp 26, the filament resistance (which initially is about 0.6 ohm) increases as the filament becomes incandescent, and the filament burns out and becomes an open circuit as the lamp flashes. The moment at which the lamp 26 flashes and its filament becomes an open circuit, is a critical moment at which another lamp is most likely to undesirably flash, because when the filament of lamp 26 becomes an open circuit the remaining energy in capacitor 12 is available for the remaining lamps. However, at this moment the energy remaining in capacitor 12 has been reduced to a value such that it cannot overcome the threshold points of the diode means with sufficient energy to cause another lamp to flash.

Upon the next momentary closing of the switch 17, in synchronization with the opening of the camera shutter, the diode means 31 becomes conductive and most of the electrical discharge pulse energy from the capacitor 12 flows through the second flash lamp 27, via the diode means 31, since the first lamp 26 now is an open circuit and the other diode means 32 has a higher threshold point than does diode means 31. The energy discharge through lamp 27 is reduced slightly by the voltage drop of diode means 31 and by the small amount of energy flowing through diode means 32 and lamp 28, but is ample for causing the lamp 27 to flash. Upon the next (third) momentary closing of switch 17, the previously flashed lamps 26 and 27 are open circuits, and most of the pulse energy from capacitor 12 flows through the diode means 32 (which automatically becomes conductive) and lamp 28, causing lamp 28 to flash. When the next (fourth) firing energy pulse occurs, it flows through both diode means 31, 32, and lamps 29 in series, causing the lamp 29 to flash.

The circuit of FIG. 1 not only is simple and economical to manufacture, since it employs only two inexpensive diode means for controlling the sequential flashing of four lamps, but it also achieves equalization of the firing pulse energy applied to each lamp to be flashed, thus improving the reliability of flashing one (and only one) lamp per firing pulse as compared with the above-described prior-art series-resistance circuit. This equalization is achieved by consuming approximately equal portions of energy of each of the firing pulses in the diode circuit as the various lamps are flashed, this partial consumption of firing pulse energy being due to drain-off in parallel circuits when the "earlier" lamps are flashed, and also being due to energy loss in series diodes when "later" lamps are flashed. For example, when the first lamp 26 is being flashed, a portion of the firing pulse energy is drained off through the three parallel circuit branches composed of lamps 27, 28, 29; diode means 31 and lamp 27; and diode means 32 and lamp 28. When the second lamp 27 is being flashed, there is a lesser drain-off of pulse energy, through diode means 32 and lamp 28, but there also is some loss of pulse energy in the series diode 31. When the third lamp 28 is being flashed, there is a small drain-off of pulse energy through the series path of diode 31, lamp 29, and diode means 32, and a relatively greater loss in the series diode means 32. When the fourth lamp 29 is being flashed, there is some pulse energy loss in the series diode means 31 and 32.

Figure 3:
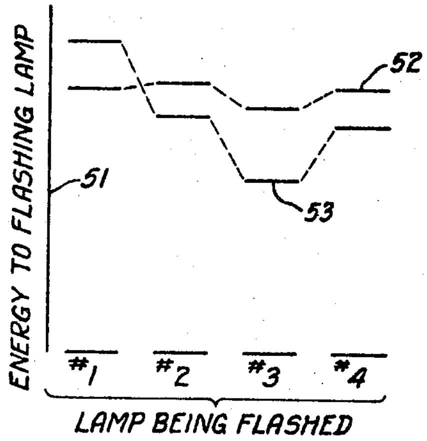
FIG. 3 is a set of plots of the firing pulse energy sequentially applied to each flash lamp, for the circuit of FIG. 1 and also for a prior-art resistor circuit.

FIG. 3 illustrates how the aforesaid pulse energy losses, in series and parallel diode circuits, equalizes the firing pulse energy applied to each lamp to be flashed. In FIG. 3, the vertical axis 51 represents firing pulse energy applied to the lamp to be flashed, versus a horizontally arranged representation of the four lamps of an array. The plot 52 indicates, in the solid line portions thereof, the pulse energy applied sequentially to each of the lamps to be flashed. For comparison, the plot 53 indicates, in the solid line portions thereof, the firing pulse energy applied sequentially to each of the lamps to be flashed in a prior-art resistance circuit in which resistors having resistance values of about 5 or 10 ohms are successively connected in series with the lamps. The plots 52 and 53 indicate the improved uniformity of firing pulse energy achieved by the simplified circuit of the inventon.

Figure 2:
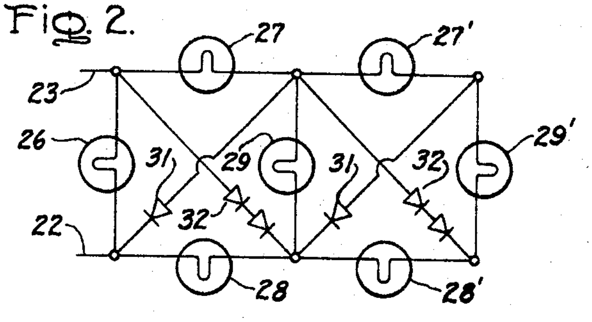
FIG. 2 shows a modification of the circuit of FIG. 1 in accordance with the invention.

The seven-lamp circuit of FIG. 2 includes the four-lamp basic configuration of FIG. 1, with an additional circuit configuration connected across the fourth lamp 29. The lamp 29 functions both as the fourth lamp of the first configuration and as the first lamp of the second configuration. After the lamp 29 is flashed, the lamps 27', 28', and 29' flash sequentially in the same manner as described above for the lamps 27, 28, and 29. Any one or more of the flash lamps can be replaced with a resistor, or the last lamp 29' can be omitted, if fewer lamps are desired in an array.

The circuitry of the invention can be incorporated into a camera or flash adaptor instead of in a disposable flash array, with the requisite number of electrical connectors being provided for connecting the filament lead wires of the lamps 26, etc., of the array respectively to the different junction points 33, 34, etc., of the circuit.

While a preferred embodiment of the invention, and modification thereof, have been shown and described, other embodiments and modifications thereof will become apparent to persons skilled in the art, and will fall within the scope of invention as defined in the following claims.

What I claim as new and desire to secure by Letters Patent of the United States is:

1. A circuit for causing a plurality of photoflash lamps to be flashed sequentially by sequential firing energy pulses, wherein the improvement comprises four terminal points, means adapted to electrically connect photoflash lamps to said terminal points so as to form an electrical series circuit, and a first and a second diode means in criss-cross manner between opposite points of said series circuit, said diode means having mutually different threshold conductivity characteristics, first and second adjacent terminal points of said series circuit being adapted for connection to a source of said firing energy pulses.

2. A circuit as claimed in claim 1, in which the conductivity threshold voltage of one of said diode means is approximately twice that of the other.

3. A circuit as claimed in claim 1, in which one of said diode means comprises a plurality of diodes connected in series.

4. A circuit as claimed in claim 1, in which one of said diode means is a germanium diode and the other said diode means is a silicon diode.

5. A circuit as claimed in claim 1, including fifth and sixth terminal points, means adapted to electrically connect photoflash lamps respectively between the third and fifth terminal points and between the fourth and sixth terminal points, and third and fourth diode means respectively connected between said third and sixth terminal points and between said fourth and fifth terminal points, said third and fourth diode means having mutually different threshold conductivity characteristics.

6. A circuit as claimed in claim 5, including means adapted to electrically connect a photoflash lamp between said fifth and sixth terminal points.

7. A circuit for causing a plurality of photoflash lamps to be flashed sequentially by sequential firing energy pulses, wherein the improvement comprises four photoflash lamps connected in series in a closed electrical loop, first and second diode means respectively connected between diagonally opposite lamp junctions of said series loop, and means adapted to connect a first one of said lamps to a source of said firing pulses, said diode means having mutually different threshold conductivity characteristics.

8. A first circuit as claimed in claim 7, in which the conductivity threshold voltage of one of said diode means is approximately twice that of the other.

9. A circuit as claimed in claim 7, in which one of said diode means comprises a plurality of diodes connected in series.

10. A circuit as claimed in claim 7, in which one of said diode means is a germanium diode and the other said diode means is a silicon diode.

11. A circuit as claimed in claim 7, including first and second terminal points, the lamp electrically opposite said first lamp being electrically connected across said first and second terminal points, and further including third and fourth terminal points, a third diode means connected between said first and fourth terminal points, a fourth diode means connected between said second and third terminal points, a photoflash lamp connected electrically between said first and third terminal points, and a photoflash lamp connected electrically between said second and fourth terminal points, said third and fourth diode means having mutually different threshold conductivity characteristics.

12. A circuit as claimed in claim 11, including a photoflash lamp connected between said third and fourth terminal points.

References Cited

UNITED STATES PATENTS

| | | | |
|---|---|---|---|
| 3,518,487 | 6/1970 | Tanka et al. | 431—95 X |
| 3,532,931 | 10/1970 | Cote et al. | 431—95 X |

EDWARD J. MICHAEL, Primary Examiner